United States Patent [19]

Griffiths et al.

[11] Patent Number: 4,875,954

[45] Date of Patent: Oct. 24, 1989

[54] METHOD AND APPARATUS FOR MANUFACTURING CARPET

[75] Inventors: Colin Griffiths, Lisvane; William G. Walker, Newport, both of Wales

[73] Assignee: Ebonwood Limited, Cardiff, Wales

[21] Appl. No.: 160,350

[22] Filed: Feb. 29, 1988

[30] Foreign Application Priority Data

Feb. 28, 1987 [GB] United Kingdom ................ 8704760

[51] Int. Cl.$^4$ ........................ B32B 31/08; B32B 31/12
[52] U.S. Cl. ...................................... 156/64; 156/269; 156/291; 156/324; 156/353; 156/378; 428/95; 428/96; 428/97
[58] Field of Search ................... 156/72, 324, 64, 269, 156/291, 353, 378; 428/95, 96, 97

[56] References Cited

U.S. PATENT DOCUMENTS

| 3,304,825 | 2/1967 | Preusser | 156/353 X |
| 4,059,465 | 11/1977 | Edgar et al. | 156/72 |
| 4,371,576 | 2/1983 | Machell | 428/96 X |

Primary Examiner—Robert A. Dawson
Attorney, Agent, or Firm—Young & Thompson

[57] ABSTRACT

In a carpet manufacturing method respective webs of material are provided to form an upper and a base layer respectively. The webs are advanced and brought together into superimposed relationship. A hot-melt adhesive is applied between the layers immediately before the webs are brought together. The webs are subsequently pressed together and then cooled to cause them to adhere together.

6 Claims, 5 Drawing Sheets

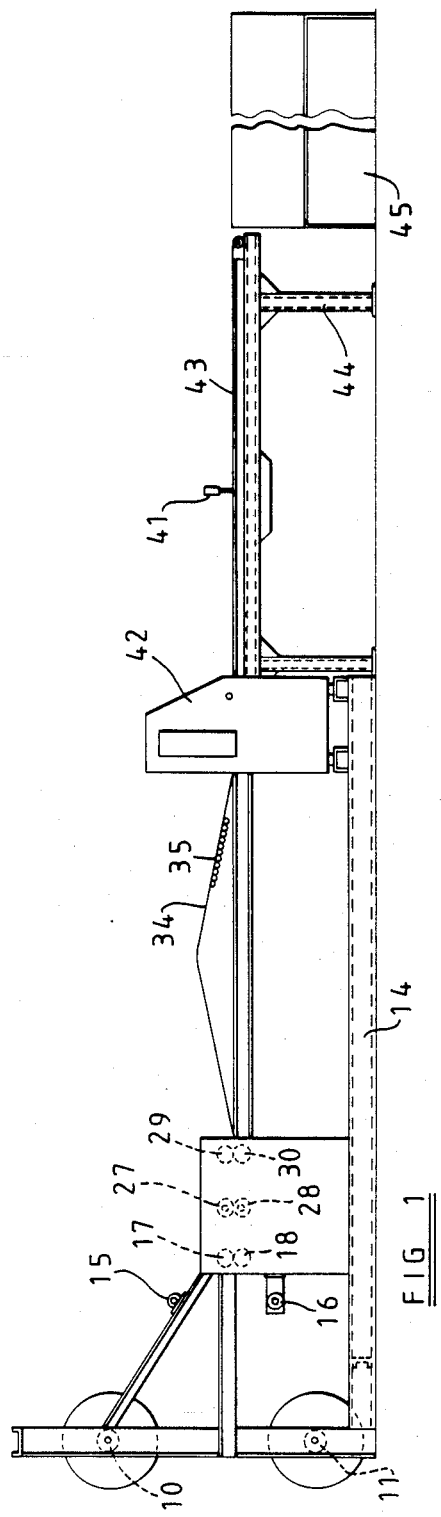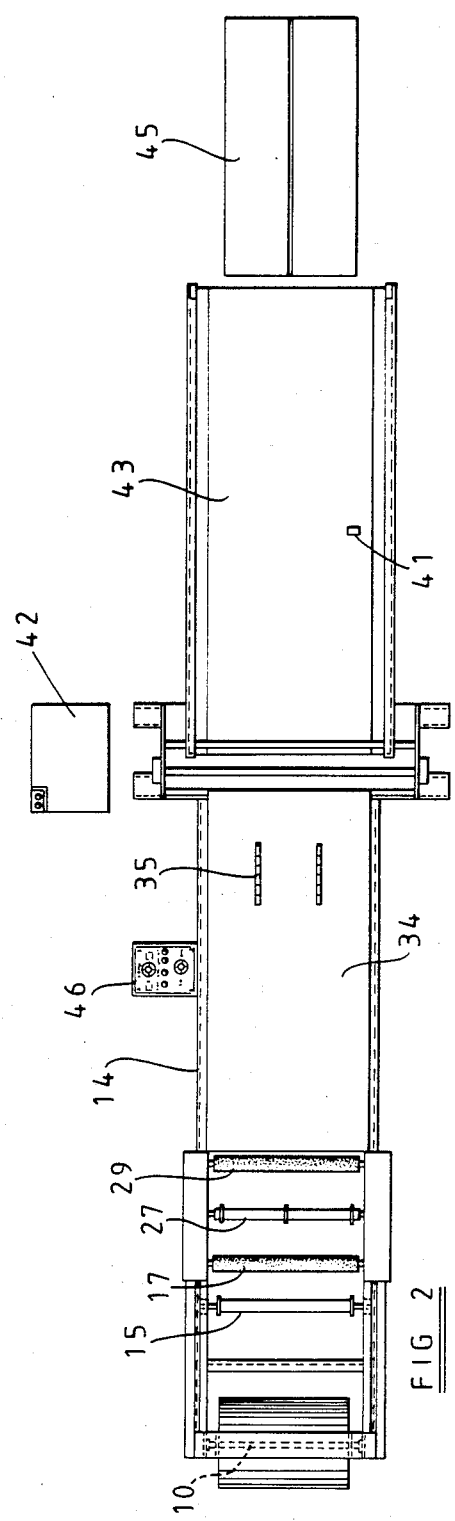

METHOD AND APPARATUS FOR MANUFACTURING CARPET

BACKGROUND OF THE INVENTION

This invention relates to carpet manufacture for the production of carpet of the kind comprising webs of tufted, looped, or other fabric or sheet material which form an upper layer, and a woven, sheet, or other base layer adhering to the upper layer. Such a carpet is convenient for making into carpet tiles, since the edges do not tend to fray because the adhesive used to stick the layers together also serves to fix the fibres of both layers against any tendency to unravel or separate, particularly at the edges.

There are many materials which can be used to form the respective layers. For example, the upper layer may include a woven fabric with tufts of wool or other material secured into it, the tufts being either cut to form an upright pile or uncut to form a loop type pile. Alternatively a felted or needle punched felt or fabric may be used. In some instances where tufted carpet is used, the tufts may be somewhat insecurely fastened in the woven fabric, at least to the extent that the upper layer would not be sufficiently strong or stable for use on its own, though it may be inexpensive to produce.

The base layer may be woven or non-woven fabric, or sheet material may be used in various forms.

A number of different methods have been devised for the production of such carpets or carpet tiles, and many of these involve more or less complex production plant. In one example a liquid permeable web forming the base layer travels vertically through a zone in which adhesive is applied to one side and this base layer is then applied to the back of a layer which will form the upper layer in the finished carpet. Pressure is applied to force the adhesive through the permeable base layer to bond the layers together and to assist in fixing tufts which form the pile. In another example, the base layer and the upper layer are joined by a layer of latex or other material which not only serves as an adhesive but also provides a cushioning layer. Complex production equipment is however required to lay down the latex layer and to assemble the layers together.

It is an object of the invention to provide a carpet manufacturing method in which carpet can be produced very efficiently and reliably, and also inexpensively, such carpeting being suitable for the production of carpet tiles.

SUMMARY OF THE INVENTION

In accordance with a primary aspect of the present invention there is provided a carpet manufacturing method comprising providing respective webs of material to form an upper and a base layer respectively, the webs being advanced and brought together into superimposed relationship, a hot-melt adhesive being applied between the layers immediately before the webs are brought together, and the webs being subsequently pressed together and then cooled to cause them to adhere together.

Preferably the adhesive is applied by means of one or more nozzles delivering the adhesive in a spread pattern, whereby a substantially uniform layer of the adhesive is laid down. Conveniently the webs are supplied from respective spaced rolls, and the webs are guided together, the adhesive being applied immediately prior to bringing the webs together. The hot-melt adhesive is conveniently applied from a number of spaced nozzles arranged to provide a uniform pattern of adhesive on the surfaces of the layers on either of them. Preferably an aerated supply of adhesive is delivered to the nozzle or to each of them.

Conveniently the carpet may be conveyed to a measuring and cutting installation whereby measured lengths are cut off in succession. Preferably the measuring means of this installation include switch means engageable by the carpet and arranged to actuate the cutting means of the installation. By this means carpet tiles are produced in succession as the carpet is produced, from the combined upper and base layers.

According to a further aspect of the invention there is provided apparatus for carpet manufacture comprising means for supplying and advancing webs of material to form an upper layer and a base layer respectively, the webs being brought together, and a device for delivering hot-melt adhesive between the layers at a zone immediately prior to the position at which the webs are brought together, and means being provided in succession, for pressing the webs together and for cooling the webs to cause them to adhere together.

Preferably the device for delivering hot-melt adhesive comprises one or more nozzles arranged to lay down adhesive in a layer of generally uniform thickness. The hot-melt adhesive is preferably supplied in aerated form from a supply unit to nozzles position to spray the adhesive evenly between the webs.

Conveniently, rolls to carry the respective materials are positioned to allow delivery of the webs one above the other in continuous form.

The apparatus may include means for measuring and cutting successive lengths of the carpet to form carpet tiles. The measuring means may include switch means engageable by the carpet to control operation of the cutting means.

The cutting means may comprise a guillotine knife arranged to cut across the width of the strip emanating from the apparatus for assembling the webs together Advantageously the apparatus includes a frame on which the carpet is assembled, measured, and cut in succession, to form a continuous series of carpet tiles.

BRIEF DESCRIPTION OF THE DRAWINGS

The invention will now be described by way of example with reference to the accompanying drawings in which:

FIG. 1 is a side elevation view of carpet manufacturing apparatus constructed in accordance with the invention, FIG. 2 is a plan view of the apparatus.

DETAILED DESCRIPTION OF THE DRAWINGS

FIGS. 1 and 2 show the layout of apparatus for production of carpet suitable for making into carpet tiles, which are produced successively as will be described. As seen in FIGS. 1 and 2, as well as FIG. 3, the apparatus includes a pair of supply rolls 10, 11 on which, in use, are provided respective supplies of fabric or sheet material 12, 13 in substantially continuous web form. Typically the webs of material are one metre in width, though it is to be understood that the apparatus is suitable for the production of carpets of varying widths. When one of the supply rolls is nearly exhausted, the end from a new supply on a further roll is joined to the end of the nearly exhausted one so that the supply is not interrupted. Only one pair of rolls 10, 11 is however illustrated.

Figure 3:
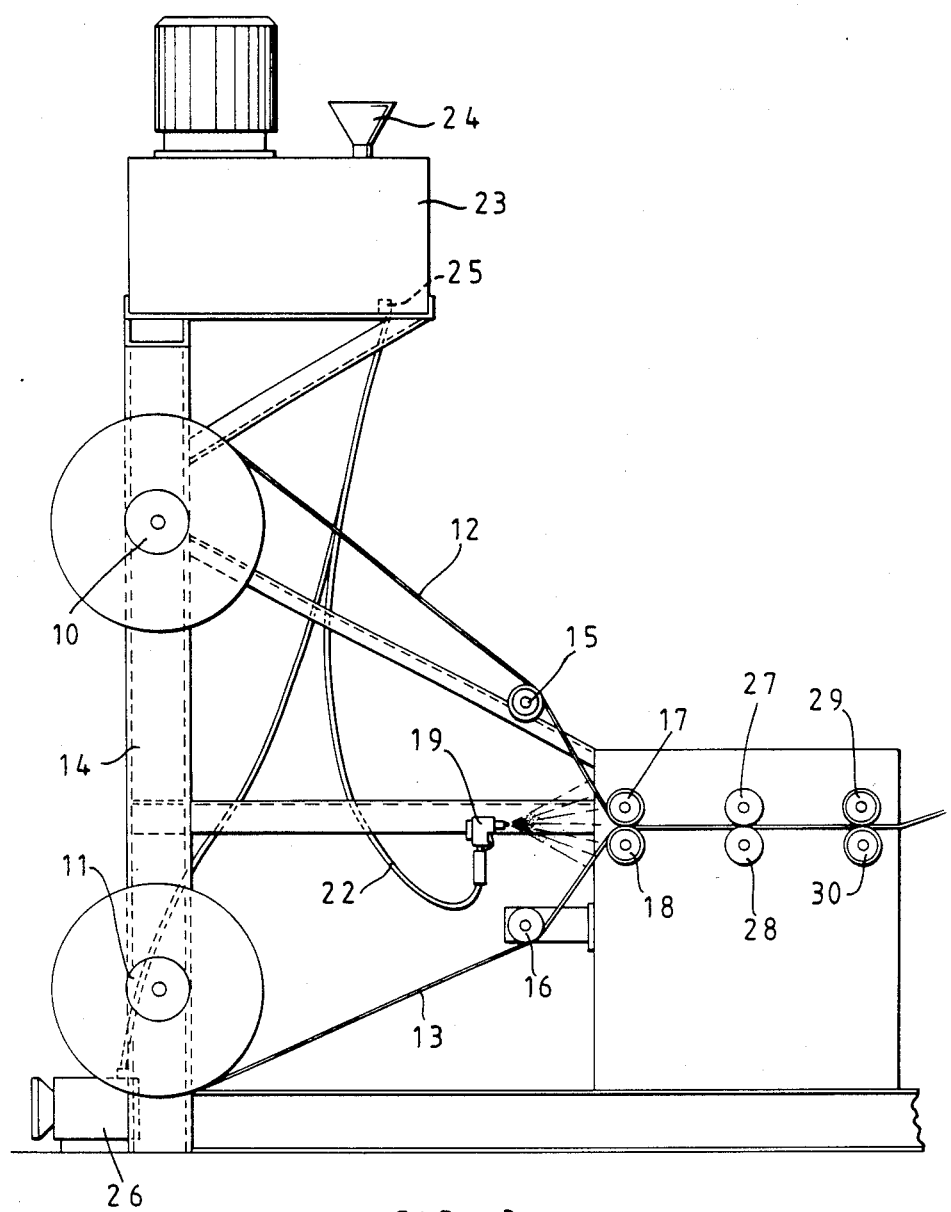
FIG. 3 is an enlarged side elevation view, partly in cross-section, of an adhesive application portion of the apparatus.

The two rolls 10, 11 are mounted on a frame 14 and are positioned one above the other with a substantial space between. In certain instances it may be convenient to offset the rolls or to provide supplies from rolls mounted on separate frames. However, the webs 12, 13 shown in FIG. 3 issuing from the rolls, should be accurately positioned one above the other, and are arranged to be brought together by means of upper and lower guide rollers 15, 16. The webs are brought together between first pressure rollers 17, 18. Their angles immediately prior to being brought together are large relatively to the median plane (represented by the horizontal).

Figure 5:
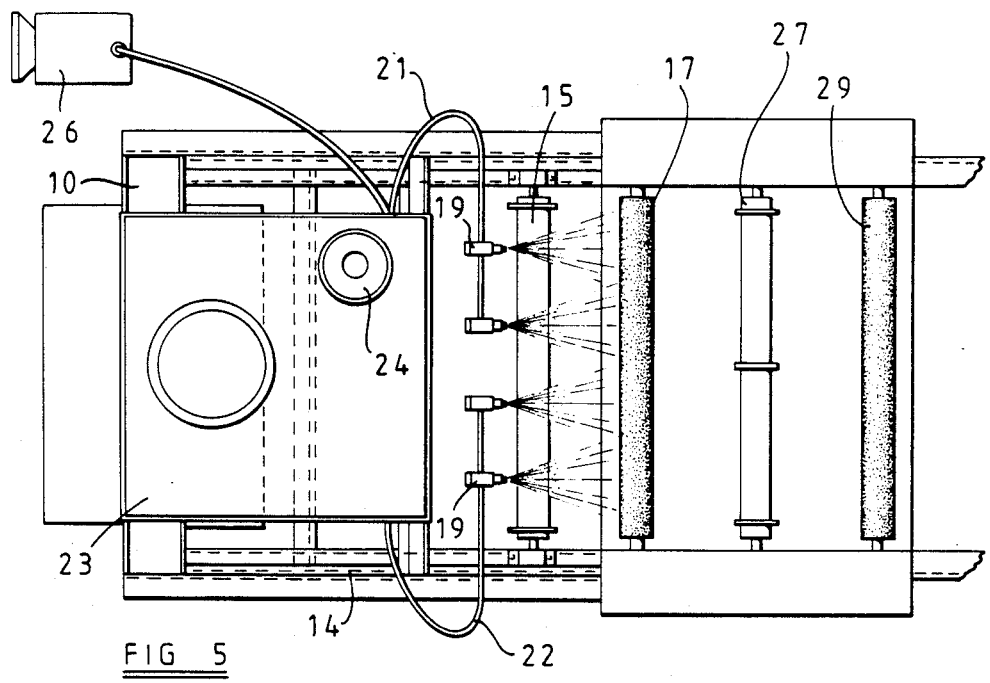
FIG. 5 is a plan view of the apparatus shown in FIG. 3.

Immediately prior to the position at which the webs are brought together, there is laid down a film of adhesive as seen particularly in FIGS. 3 and 5. The adhesive is delivered from a series of nozzles 19 positioned in line across the line of advance of the webs and between them. The nozzles 19 are each arranged to deliver adhesive in an aerated diffuse spray pattern of highly atomized, finely and evenly distributed form. In the example illustrated, four nozzles are used. They are connected in two pairs, to supply conduits 21, 22.

Figure 4:
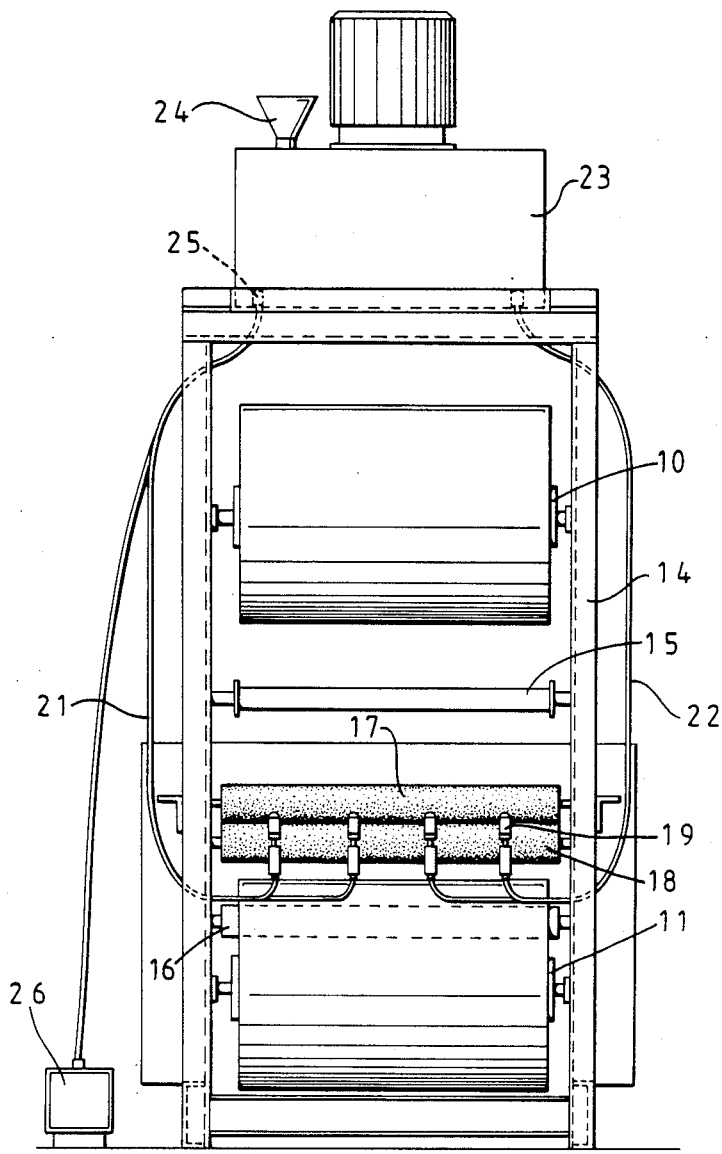
FIG. 4 is an end view of the portion of the apparatus shown in FIG. 3.

To supply the adhesive there is a hot-melt supply system shown in FIGS. 3, 4, and 5 comprising a supply tank 23 mounted at the top of the support frame 14. This has a filler 24, a heater to maintain the adhesive at a temperature at which it is liquid and of relatively low viscosity, an air inlet, and two outlets connected in the base of the tank and incorporating valves indicated at 25. An air compressor 26 is arranged to provide a supply of compressed air to the tank 23 and is fed to the two outlet valves 25, at which adhesive is also supplied. As the air and adhesive mix, the adhesive becomes finely divided and atomized. It is delivered to the nozzles 19 through the conduits 21, 22 to issue from the nozzles evenly to cover the area of the two webs 12, 13 immediately before they are brought together. It is possible to adjust the nozzles, and the quantity supplied to them, in order to ensure that the correct quantity is delivered.

As seen in FIG. 5, the supply conduits 21, 22 are led along opposite sides so that the supply lines do not interfere with the webs 12, 13.

Immediately following the first pressure rollers 17, 18 are two further pairs 27, 28 and 29, 30 of rollers The rollers 27, 28 are slitting rollers for trimming the two opposite edges, and for slitting the centre of the webs.

Figure 6:
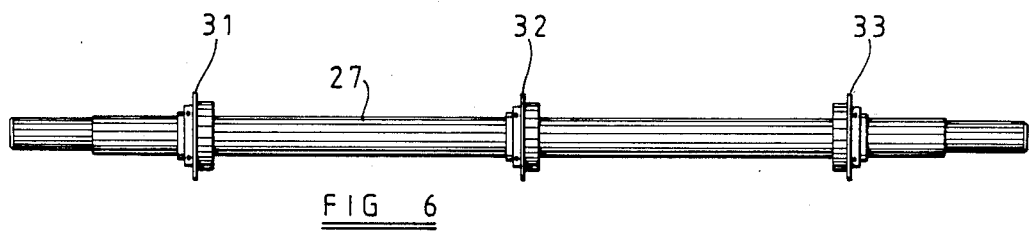
FIG. 6 is a view of a slitting shaft used in the apparatus.

One slitting roller, as seen in FIG. 6, is provided with three spaced slitting knives 31, 32, 33 and the other slitting roller 28 has grooves to engage with these knives. The rollers 29, 30 are further pressure rollers and drive rollers. Rollers 17, 18, 29, and 30 are rubber covered. Rollers 29, 30 serve to pull the webs 12, 13 off the rolls 10, 11, and to drive the assembled carpet forward through the remaining zones of the apparatus.

There is a zone downstream of the rollers 29, 30 in which an arched plate 34 causes the carpet to be raised into a hump. Near the downstream end of this plate 34 there are sets of rollers 35 which are let into the surface of the plate.

Figure 7:
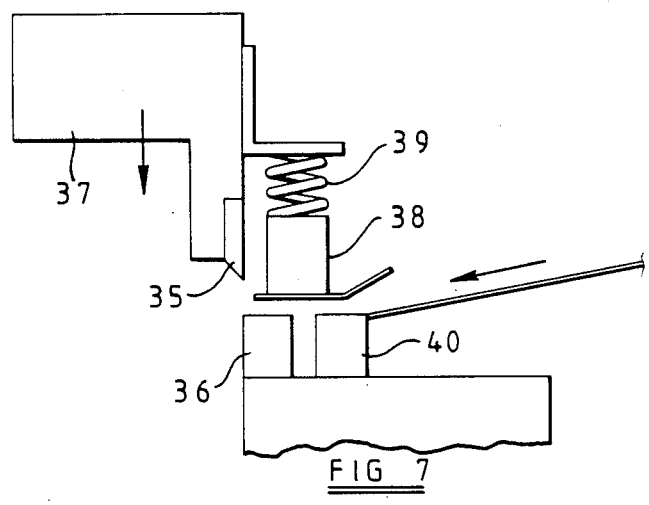
FIG. 7 is a view of a cutting installation of the apparatus.

There is then a cutting installation the components of which are also illustrated in FIG. 7. This installation includes a reciprocable cutting knife 35 acting against a fixed bar 36, by means of which a shearing action to cut the carpet can take place. The cutting knife 35 is mounted on a carriage 37 which also carries a pressure bar 38 connected to the carriage by a spring 39. The arrangement is such that when the carpet is to be cut across its full width, the knife carriage is moved downwards. The carpet is positioned not only between the knife 35 and the bar 36, but also between the pressure bar 38 and the bar 36, as well as a further fixed bar 40. As the carriage 37 moves downwards, the pressure bar 38 first comes into contact with the carpet, thus arresting further forward motion of the carpet. The knife next meets the carpet and slices through it. The guillotine knife 35 acts against the fixed bar 36, and there is preferably a small angle between these across the width of the machine, whereby a progressive shearing action takes place. The speed of operation of the knife can be varied to provide a clean cut on different types of carpet being produced. A drive unit 42 is shown in FIGS. 1 and 2, by means of which the cutting installation can be controlled. Since the forward motion of the carpet is stopped in the cutting installation by this means, and since the pressure and drive rollers 29, 30 continue to advance the carpet, there is need for some lost motion. This is accommodated by the hump created by the arched plate 34.

In use, the carpet is advanced through the cutting installation until its end reaches the operating arm of a limit switch 41. The switch is connected in a circuit (not shown) which first operates carriage 37 to stop the further advance of the carpet and then to cut it as described.

The limit switch 41 is positioned at a distance from the cutting installation and is disposed at the top surface of a conveyor 43 mounted on stands 44 connected to, or immediately adjacent to, the frame 14. As seen, the limit switch 41 is approximately half way along the length of the conveyor. As a cut end of carpet reaches the limit switch, the carpet is stopped and cut in the cutting installation as described. The conveyor is continuously driven so that as the carpet pieces which have been cut off are released by the pressure bar 38, the conveyor will advance them to the end of the conveyor, where they will fall side by side, onto a pallet 45. Stacks of cut pieces will thus accumulate on this pallet.

At the side of the apparatus there is a central control unit 46.

Since the tiles which are cut off in pairs at each operation of the knife, are together of full width of the carpet strip being advanced, tiles are produced which are greater in width as well as length than the majority of tiles now being produced by other apparatus of this general kind. Typically a length of each tile may be 500 mm, so that a tile size is 500 mm by 500 mm. Such a size affords a rigid tile which is less likely to move when in a position, in use.

Figure 8:
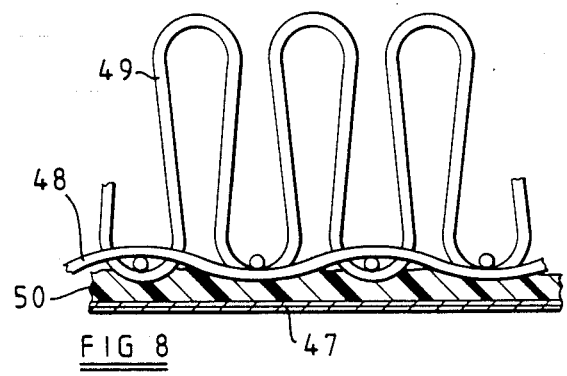
FIG. 8 is an enlarged section of a carpet constructed in accordance with the invention.
Figure 9:
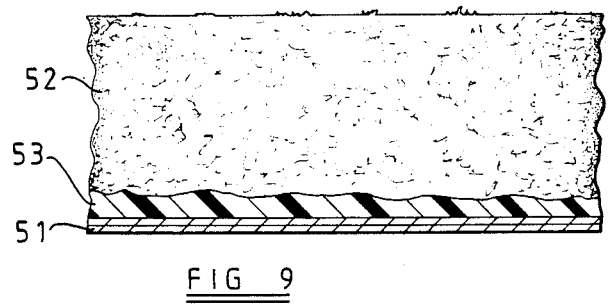
FIG. 9 is an enlarged cross-section of an alternative form of carpet constructed in accordance with the invention.

With reference to FIGS. 8 and 9, it will be seen that the process can be applied to the production of various types of carpet, including that shown in FIG. 8 where a woven fabric 47 forms the base layer. The upper layer 48 is formed by a further woven fabric into which are engaged loops 49 of a further material to make a loop-pile type carpet. Natural or artificial fibres can be used for any of the fabric materials and a substantial variety of types of material can be used. In place of the loop pile, upright tufts can be produced by cutting the loops, in conventional manner.

To secure the upper layer formed by the fabric 48 and the loops 49, to the base layer 47, there is a film of adhesive indicated at 50 which is laid down in the manner already described onto the adjoining surfaces of the base layers.

The alternative arrangement shown in FIG. 9 includes a base layer 51 similar to that in FIG. 8, and a needle punch or felted layer 52 which replaces the fabric and loop pile. Again the film of adhesive 53 is used to secure these two layers together.

When the upper layer is formed with tufts or loops, as seen in FIG. 8, the fabric which anchors these may not have any great strength. The application of the adhesive layer 50 and the base layer 47 thus serves to anchor the tufts or loops and to give high strength to the finished product. The application of adhesive over the whole area of the carpet renders this particularly suitable for the production of carpet tiles, as described, since there is no tendency for fibres to unravel or separate during continued use of the finished carpet. However, it is to be understood that the apparatus can be used without the measuring and cutting installation, to produce carpet which is afterwards cut into larger pieces, as required.

The adhesive is advantageously of the hot-melt type, and in one example is a blend of polyolefins and copolymers together with hydrocarbon tackifiers. It is a delayed setting hot-melt adhesive, the delay being due to post partial crystallisation of the polymeric structure.

Preferably the adhesive layer is discharged from the nozzles 19 at a temperature between 180° C. and 225° C. It is cooled by the air as it flies onto the material in generally non-uniform size particles, but provides substantially even coverage of the area.

If the adhesive is too warm it will carbonize, but the temperature may be elevated to a small degree so that some carbon production takes place, since this will afford an anti-static characteristic to the finished carpet.

The adhesive may be applied at a temperature which is higher than the melting point of the material itself, thus giving some bonding through melting of such material, but temperature control is critical if excess melting is to be avoided.

We claim:

1. A carpet manufacturing method comprising providing respective webs of material to form an upper layer and a base layer respectively, advancing and bringing together the webs into superimposed relationship, applying a hot-melt adhesive between the layers by means of at least one nozzle delivering the adhesive in an aerated diffuse spray pattern, immediately before the webs are brought together, and subsequently pressing the webs together and cooling them to cause them to adhere together.

2. A method according to claim 1, wherein the resulting carpet is conveyed to a measuring and cutting installation where measured lengths are cut off in succession.

3. A method to claim 2, wherein the measuring means of said installation include switch means engageable by the carpet and arranged to actuate the cutting means of said installation.

4. Carpet manufacturing apparatus comprising means for supplying and advancing webs of material to form an upper layer and a base layer respectively, the webs being brought together, at least on nozzle for delivering hot-melt adhesive in an aerated diffuse spray pattern between the layers at a zone immediately prior to the position at which the webs are brought together, and means provided in succession for pressing the webs together and for cooling the webs to cause them to adhere together.

5. Apparatus according to claim 4, further comprising means for measuring and cutting successive lengths of the resulting carpet to form carpet tiles.

6. Apparatus according to claim 5, wherein the measuring means of said installation include switch means engageable by the carpet and arranged to actuate the cutting means of said installation.

* * * * *